(12) United States Patent
Hayashi et al.

(10) Patent No.: US 6,407,517 B1
(45) Date of Patent: Jun. 18, 2002

(54) METHOD OF ATTENUATING UNWANTED ELECTRIC FIELD RADIATION AND A CATHODE RAY TUBE DISPLAY

(75) Inventors: Shigeo Hayashi, Toubu-machi; Makoto Shiobara, Nagaoka, both of (JP)

(73) Assignee: Totoku Electric Co., Ltd., Tokyo (JP)

( * ) Notice: Subject to any disclaimer, the term of this patent is extended or adjusted under 35 U.S.C. 154(b) by 0 days.

(21) Appl. No.: 08/739,693

(22) Filed: Oct. 29, 1996

(30) Foreign Application Priority Data

Feb. 27, 1996 (JP) .............................................. 8-067072

(51) Int. Cl.$^7$ .............................................. H01J 29/56
(52) U.S. Cl. .............................. 315/370; 315/8; 315/85
(58) Field of Search .............................. 315/370, 8, 85; 361/150

(56) References Cited

U.S. PATENT DOCUMENTS 5,231,332 A * 7/1993 Beaumont et al. ............. 315/85
5,243,262 A * 9/1993 Moen ......................... 315/370
5,475,287 A * 12/1995 Okuyama et al. ........... 315/370

FOREIGN PATENT DOCUMENTS

JP        7-288831        10/1995

* cited by examiner

*Primary Examiner*—Theodore M. Blum
(74) *Attorney, Agent, or Firm*—Jordan and Hamburg LLP

(57) ABSTRACT

A method of attenuating an unwanted electric field radiation caused by electrostatic induction on an internal conductive coating of a cathode ray tube by a pulse voltage generated by a deflection circuit is provided. A reverse pulse voltage, which is reverse in polarity to the pulse voltage of the deflection circuit, is impressed on an external conductive coating of the cathode ray tube and electrostatic induction induces a pulse voltage on the internal conductive coating which is reverse in polarity to a pulse voltage of the deflection yoke induce on the internal conductive coating through an electrostatic capacitance existing between the internal conductive coating and the external conductive coating so that an unwanted electric field radiation from the front screen of a cathode ray tube is attenuated.

6 Claims, 2 Drawing Sheets

Prior Art

METHOD OF ATTENUATING UNWANTED ELECTRIC FIELD RADIATION AND A CATHODE RAY TUBE DISPLAY

BACKGROUND OF THE INVENTION

The present invention relates to a method of attenuating unwanted electric field radiation which is radiated from the front screen of a cathode ray tube display and a cathode ray tube display having reduced unwanted electric field radiation emitted from a front screen thereof.

Unwanted electric field radiation from cathode ray tube displays is a subject of concern. For example, low frequency electric field radiation (5 Hz to 400 kHz) is banned by various regulations including TCO and MPR (SSI) of Sweden. It is said that electromagnetic waves derived from the electric field may be hazardous to human and animal bodies as well as cause faults or errors in peripheral electronic devices.

One source of electric field radiation generated by a cathode ray tube display is a high-voltage ripple which has a horizontal deflection period and is generated in a high voltage circuit for supplying a high voltage to an anode electrode of the cathode ray tube. Another source of electric field radiation generated by a cathode ray tube display is electrostatic induction by a pulse voltage which is output from a deflection circuit and appears at a horizontal deflection coil and has a horizontal deflection period. The present invention eliminates the radiation from the electrostatic induction by the pulse voltage generated in the horizontal deflection coil.

A conventional method of attenuating the radiation resulting from high-voltage ripple which has a horizontal deflection period and is generated in a high voltage circuit is disclosed by the applicant in Japanese Patent Application 104893/1994 (Japanese Patent Laid-open Publication 288831/1995). Referring to FIG. 4, this conventional method of attenuating electric field radiation provides a winding 10 as a means for producing a negative pulse which has a horizontal deflection period, at a secondary side M2 of a flyback transformer 13 which is a major component of a high voltage circuit 3. The high voltage circuit 3 is arranged such that the negative pulse produced by the winding 10 of the negative pulse generating means is superimposed on a high voltage HV through a smoothing capacitor 11 connected to the output of the flyback transformer 13. Thus, the high-voltage ripple which has a horizontal deflection period is cancelled. This arrangement also allows unwanted electric field radiation generated by a pulse voltage which has a horizontal deflection period and is generated from a horizontal deflection coil, which is a member of a deflection yoke and so on, to be attenuated. As a result, electric field radiation from the cathode ray tube display is attenuated.

When the conventional unwanted electric field attenuating method is applied to a cathode ray tube display having a deflection circuit and a high voltage circuit separately provided, the horizontal deflection period pulses are generated respectively. The horizontal deflection period pulse voltages of the two separate circuits are determined independently for optimum setting and are different from each other in the pulse width, amplitude, and phase.

More specifically, even if the two, deflection and high voltage, circuits are driven concurrently by a single drive pulse signal, their horizontal deflection period pulse voltages generated respectively in each circuit do not have the same pulse width, amplitude, and phase due to difference between their components or operating conditions. For example, when the high voltage circuit employs as an output element an FET which has no storage time, its horizontal deflection period pulse voltage will resultantly be out of phase with the horizontal deflection period pulse voltage of the deflection circuit.

In the conventional unwanted electric field attenuating method, while radiation from the high voltage ripple in the horizontal deflection period is rationally attenuated, another unwanted radiation caused by the electrostatic induction by the horizontal deflection period pulse voltage of the deflection circuit, including a deflection yoke, is negligibly reduced.

SUMMARY OF THE INVENTION

Referring to FIG. 3, the electric field caused by the electrostatic induction of a pulse voltage which has a horizontal deflection period and generated from the deflection circuit including the deflection yoke and radiated from the front screen of the cathode ray tube display is explained. As shown, a deflection yoke 5 is mounted on a cathode ray tube 6 and, in a normal drive mode, is loaded with a horizontal deflection period pulse voltage which has a waveform denoted by A. As the deflection yoke 5 is directly mounted to the cathode ray tube 6, electrostatic induction occurs at the internal conductive coating 2 of the cathode ray tube 6 by electrostatic induction coupling with the pulse voltage in the deflection yoke 5. Accordingly, a pulse voltage, with a wave form denoted by A1 in FIG. 2, is radiated as the unwanted electric field from the front screen of the cathode ray tube 6.

It is an object of the invention to eliminate the foregoing problem by providing a method for attenuating electric field radiation caused by electrostatic induction on an internal conductive coating of a cathode ray tube by a pulse voltage which is produced by a deflection yoke in a deflection circuit and has a horizontal deflection period, and to provide a cathode ray tube display having reduced electric field radiation emitted from front screen thereof.

According to a feature of the present invention a method is provided wherein, a pulse voltage B1, which is reverse polarity to and synchronized with a pulse voltage output A1 of a deflection circuit in a cathode ray tube display, is produced and applied to an internal conductive coating of a cathode ray tube through an electrostatic capacitance formed between the internal conductive coating and an external conductive coating of the cathode ray tube by impressing a pulse voltage B, which is reverse in polarity to and synchronized with a pulse voltage output A of the deflection circuit, on the external conductive coating so as to cancel the ripple voltage A1 which has the horizontal deflection period and is generated from the deflection yoke. As a result, unwanted electric field radiation from a front screen of the cathode ray tube is attenuated.

The pulse voltage B which is reverse in polarity to and synchronized with the pulse voltage output A of the deflection circuit is optionally impressed on a conductive film placed directly over the external conductive coating.

According to another feature of the present invention, a cathode ray tube display includes a cathode ray tube having an internal conductive coating, an external conductive coating and a deflection yoke mounted on the cathode ray tube, and a reverse pulse voltage impressing means having a cancellation transformer with a secondary winding coupled to the external conductive coating via a capacitor. The reverse pulse voltage impressing means impresses on the internal conductive coating, through an electrostatic capacitance existing between the internal conductive coating and the external conductive coating, a pulse voltage B1 which is reverse in polarity to a pulse voltage A1 applied to the internal conductive coating through an electrostatic capacitance formed between the deflection yoke and the internal conductive coating.

It is preferable that the reverse pulse voltage impressing means includes a variable resistor for controlling the amplitude of the pulse voltage B1.

As the pulse voltage B, which is reverse in polarity to and synchronized with a pulse voltage output A of the deflection circuit in a cathode ray tube display, is impressed on the external conductive coating, electrostatic induction produces a pulse voltage B1 which is reverse in polarity to and synchronized with a pulse voltage output A1 of the deflection circuit at the internal conductive coating through the electrostatic capacitance formed between the internal conductive coating and the external conductive coating. Accordingly, unwanted electric field radiation from the front screen of the cathode ray tube display is attenuated.

DETAILED DESCRIPTION OF THE INVENTION

Figure 1:
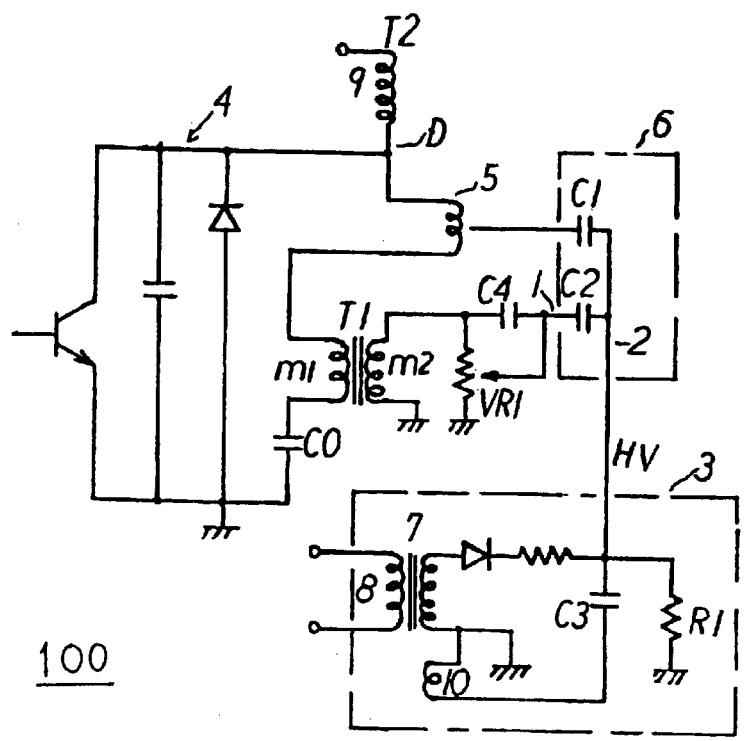
FIG. 1 is a circuit diagram showing an embodiment of the present invention.

Referring to FIG. 1, a deflection yoke 5 is connected at one end to a junction D between a primary coil 9 of a horizontal output transformer T2 and a deflection circuit 4, and at the other end to ground via a primary coil m1 of a cancellation transformer T1 and an S-shaped capacitor C0. Denoted by 6 is a cathode ray tube in which a pulse voltage across the deflection yoke 5 is applied by electrostatic induction to an internal conductive coating 2 through an electrostatic capacitance C1 formed between the deflection yoke 5 and the internal conductive coating 2 of the cathode ray tube 6. Also, a voltage, which is in reverse phase with the pulse voltage from the deflection yoke 5, is applied by electrostatic induction to the internal conductive coating 2 through an electrostatic capacitance C2 formed between the internal conductive coating 2 and an external conductive coating 1.

A secondary coil m2 of the cancellation transformer T1 is connected at one end to ground and the other end also to ground via a variable resistor VR1. The other end is also connected through a capacitor C4 to the external conductive coating 1 of the cathode ray tube 6. Accordingly, the amplitude of the pulse voltage applied by electrostatic induction to the internal conductive coating 2 of the cathode ray tube 6 is adjustable by controlling the variable resistor VR1. A high voltage circuit 3 contains a flyback transformer 7, a smoothing capacitor C3, and a bleeder resistor R1 for feeding a high voltage HV to an anode connected to the internal conductive coating 2 of the cathode ray tube 6.

Figure 2:
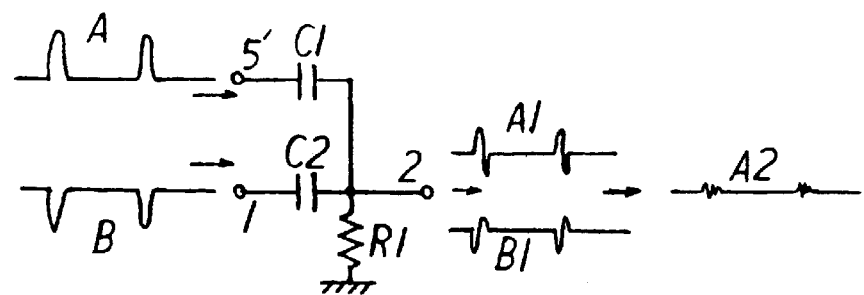
FIG. 2 is a circuit diagram equivalent to that of FIG. 1.
Figure 3:
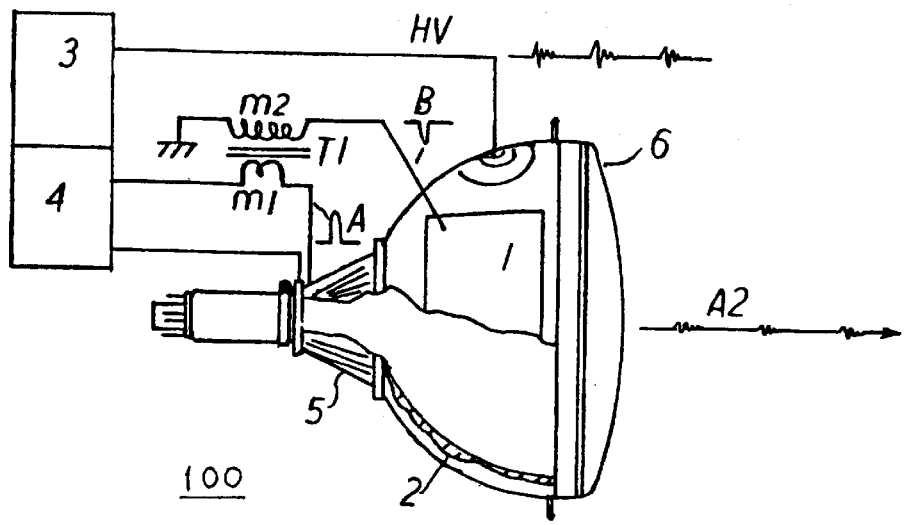
FIG. 3 is a circuit diagram showing unwanted electric field derived from a deflection circuit.
Figure 4:
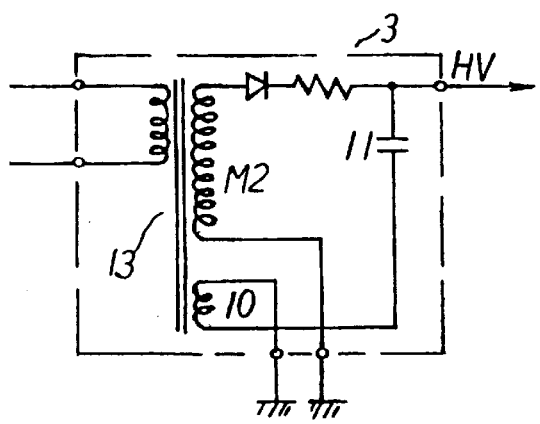
FIG. 4 is a circuit diagram showing a prior art device.

The functioning of the present invention is explained below by reference to FIG. 2 which is equivalent to the diagram of FIG. 1. Shown are the deflection yoke input 5', the internal conductive coating 2 of the cathode ray tube 6, the bleeder resistor R1 of the flyback transformer 7, and the capacitance C1 existing between the deflection yoke 5 and the internal conductive coating 2 of the cathode ray tube 6. As the capacitor C1 and the bleeder resistor R1 form a differentiating circuit, a pulse voltage having a waveform A1 is induced at the internal conductive coating 2 by application of the pulse voltage of a waveform A produced by the deflection yoke 5 and electric field radiation from the waveform A1 is radiated from the front screen of the cathode ray tube 6.

The external conductive coating 1 of the cathode ray tube 6 is coupled to the internal conductive coating 2 by the static capacitance C2 existing between the external conductive coating 1 and the internal conductive coating 2. When a negative pulse voltage, having a waveform B which is reverse in polarity to and synchronized with the pulse voltage phase of the waveform A, is produced across the secondary coil m2 of the cancellation transformer T1 and applied to the external conductive coating 1, a waveform B1 of pulse voltage is electrostatically induced at the internal conductive coating 2 due to the action of a differentiating circuit composed of the capacitor C2 and the bleeder resistor R1.

Consequently, two different pulse voltages respectively having the waveform A1 and the waveform B1, which are opposite in polarity and synchronous with each other, are developed at the internal conductive coating 2 of the cathode ray tube 6 by the electrostatic induction. By controlling the amplitude of the pulse voltage of the waveform B with the variable resistor VR1 for tailoring the waveform B1, an unwanted electric field radiation from the front screen of the cathode ray tube 6 is attenuated. More specifically, the unwanted electric field radiated from the front screen of the cathode ray tube 6 is suppressed to a low level as depicted by a waveform A2.

According to the present invention, the pulse voltage B1, of which the polarity is reverse to that of the output of the deflection yoke 5, is applied by electrostatic induction to the internal conductive coating 2 through the static capacitance C2 formed between the internal conductive coating 2 and the external conductive coating 1 of the cathode ray tube 6. As a result, the unwanted electric field radiation A2 from the front screen of the cathode ray tube 6 is attenuated to a negligible level by the electrostatic induction at the internal conductive coating 2 of the cathode ray tube 6. The radiation produced by the pulse voltage A1, electrostatically induced on the internal conductive coating 2 from the pulse voltage output A produced by the deflection yoke 5 during the horizontal deflection period, which is negligibly eliminated by any conventional method, is reduced.

Although the external conductive coating 1 of the cathode ray tube 6 is used as an electrode of the electrostatic capacitance C2 in the prescribed embodiment, the electrode may be prepared separately by having a given pattern of a conductive film placed directly on the external conductive coating 1.

It is understood that the electric field attenuating method of the present invention is successfully applicable to a CRT display in which a high voltage HV is supplied to the cathode ray tube 6 by a high-voltage power unit which is not synchronous with the horizontal period without using the flyback transformer 7.

As set forth above, in a display with the cathode ray tube, an unwanted electric field which is electrostatically induced from the pulse voltage produced by the deflection yoke in the horizontal deflection period and radiated from the cathode ray tube can successfully be attenuated by a simple means, namely, by applying to the external conductive coating of the cathode ray tube a pulse voltage having a polarity reversed to that of the pulse voltage output of the deflection yoke. Accordingly, the present invention allows the unwanted electric field radiated from the cathode ray tube to be prevented from causing electromagnetic faults in peripheral electronic devices and affecting the health of a human or animal body, thus being advantageous in actual use.

What is claimed is:

1. A method of attenuating unwanted electric field radiation from a front screen of a cathode ray tube display including a cathode ray tube having an internal conductive coating and an external conductive coating, and a deflection circuit, the method comprising the steps of:

generating a canceling pulse voltage reverse in polarity to and synchronized with a deflection circuit pulse voltage produced by said deflection circuit;

applying said canceling pulse voltage to said internal conductive coating through a capacitance existing between said internal conductive coating and said external conductive coating by impressing said cancellation pulse voltage on said external conductive coating to attenuate said unwanted electric field radiation emitted from said front screen of said cathode ray tube display;

providing a high voltage supply circuit including a high voltage output and a flyback transformer having a first secondary winding for applying a high voltage to said internal conductive coating via said high voltage output, said flyback transformer including a second secondary winding for producing a canceling ripple voltage of opposite polarity to a ripple voltage produced by said first secondary winding; and coupling said canceling ripple voltage to said high voltage output via a capacitor to cancel said ripple voltage produced by said first secondary winding.

2. The method of claim 1, wherein said cancellation pulse voltage is impressed on a conductive film placed directly over said external conductive coating.

3. A cathode ray tube display comprising:

a cathode ray tube having an internal conductive coating and an external conductive coating with a first electrostatic capacitance existing therebetween, and said cathode ray tube having a deflection yoke mounted thereon with a second electrostatic capacitance existing between said deflection yoke and said internal conductive coating;

a deflection circuit for driving said deflection yoke;

a reverse pulse voltage impressing means for impressing on said internal conductive coating via said first electrostatic capacitance a cancellation pulse voltage which is reverse in polarity to and synchronized with a deflection circuit pulse voltage which is transmitted to said internal conductive coating through said second electrostatic capacitance formed between said deflection yoke and said internal conductive coating; and a high voltage supply circuit including a high voltage output and a flyback transformer having a first secondary winding for applying a high voltage to said internal conductive coating via said high voltage output, said flyback transformer including a second secondary winding for producing a canceling ripple voltage of opposite polarity to a ripple voltage produced by said first secondary winding, and said high voltage supply circuit including a capacitor for coupling said canceling ripple voltage to said high voltage output to cancel said ripple voltage produced by said first secondary winding.

4. The cathode ray tube display according to claim 3, wherein said reverse pulse voltage impressing means includes a variable resistor for controlling an amplitude of said cancellation pulse voltage.

5. A cathode ray tube display comprising:

a cathode ray tube having an internal conductive coating and an external conductive coating with a first electrostatic capacitance existing therebetween, and said cathode ray tube having a deflection yoke mounted thereon with a second electrostatic capacitance existing between said deflection yoke and said internal conductive coating;

said deflection yoke having first and second deflection yoke inputs;

a deflection circuit for driving said deflection yoke including a horizontal output transformer having an output terminal connected to said first deflection yoke input, said deflection circuit producing a deflection yoke pulse voltage which is transmitted to said internal conductive coating through said second electrostatic capacitance formed between said deflection yoke and said internal conductive coating;

said deflection circuit including a cancellation transformer having a primary winding serially connected to said second deflection yoke input and a secondary winding so wound to produce a cancellation pulse voltage which is reverse in polarity to and synchronized with said deflection yoke pulse voltage;

said secondary winding of said cancellation transformer having first and second terminals and a variable resistance across said first and second terminals for adjusting an amplitude of said cancellation pulse voltage;

said first terminal of said cancellation transformer being capacitively coupled to said external conductive coating to transmit said cancellation pulse voltage to said internal conductive coating via said first electrostatic capacitance; and a high voltage supply circuit including a high voltage output and a flyback transformer having a first secondary winding for applying a high voltage to said internal conductive coating via a high voltage output, said flyback transformer including a second secondary winding for producing a canceling ripple voltage of opposite polarity to a ripple voltage produced by said first secondary winding, and said high voltage supply circuit including a capacitor for coupling said canceling ripple voltage to said high voltage output to cancel said ripple voltage produced by said first secondary winding.

6. The cathode ray tube according to claim 5 wherein:

said first terminal of said cancellation transformer is capacitively coupled to said external conductive coating by a coupling capacitor having a first terminal connected to said cancellation transformer and a second terminal connected to said external conductive coating; and said variable resistance has a wiper contact connected to said first terminal of said cancellation transformer by said coupling capacitor.

* * * * *